United States Patent [19]

Miree

[11] Patent Number: 4,618,081
[45] Date of Patent: Oct. 21, 1986

[54] APPARATUS FOR MOUNTING FLASHLIGHTS TO BICYCLES

[76] Inventor: Mallory F. Miree, 3512 Springhill Rd., Birmingham, Ala. 35223

[21] Appl. No.: 775,797

[22] Filed: Sep. 13, 1985

Related U.S. Application Data

[63] Continuation-in-part of Ser. No. 559,098, Dec. 7, 1983, Pat. No. 4,541,555.

[51] Int. Cl.⁴ ............................................. F21V 33/00
[52] U.S. Cl. .................................... 224/41; 224/30 A; 362/72
[58] Field of Search ................... 224/41, 30 R, 36, 35, 224/39, 30 A, 901; 362/72

[56] References Cited

U.S. PATENT DOCUMENTS

| 441,679 | 12/1890 | Lynam | 224/36 X |
| 1,061,102 | 5/1913 | Morton et al. | 248/185 |
| 1,222,458 | 4/1917 | Peterson | 224/41 X |
| 1,332,201 | 3/1920 | Borgarello | 248/185 X |
| 1,735,212 | 11/1929 | Pawsat | 224/41 X |
| 2,220,220 | 11/1940 | Cusimano | 224/42.45 R |
| 2,270,931 | 1/1942 | Corcoran | 224/909 X |
| 2,401,041 | 5/1946 | Belau | 248/178 |
| 2,536,071 | 1/1951 | McClung | 224/36 |
| 2,588,671 | 3/1952 | Tringali | 224/30 R |
| 2,621,881 | 12/1952 | Bussmann | 248/219.4 |
| 2,778,931 | 1/1957 | Cruz | 248/185 X |
| 2,788,763 | 4/1957 | Ries | 280/289 H |
| 3,258,235 | 6/1966 | Mozley, III | 248/180 X |
| 3,427,024 | 2/1969 | Cross | 248/214 X |
| 3,620,491 | 11/1971 | Baclit | 248/104 X |
| 3,810,559 | 5/1974 | Stanton | 224/41 |
| 4,170,337 | 10/1979 | Davis | 362/72 X |
| 4,176,770 | 12/1979 | Griggs et al. | 224/30 A |
| 4,390,927 | 6/1983 | Von Feldt | 362/72 |
| 4,541,555 | 9/1985 | Miree | 224/30 A X |

FOREIGN PATENT DOCUMENTS 285978 9/1952 Switzerland .................. 280/289 H Primary Examiner—Stephen Marcus
Assistant Examiner—Robert Petrik
Attorney, Agent, or Firm—Thomas & Kennedy

[57] ABSTRACT

Apparatuses for mounting flashlights to bicycles have concave surfaces for directly supporting flashlights and which are releasibly held thereto by Velcro type material bearing straps. The apparatuses also have semi-cylindrical channels adapted to the placed in mating contact with bar elements of the bicycles and releasibly held thereto by other Velcro type material bearing straps.

12 Claims, 16 Drawing Figures

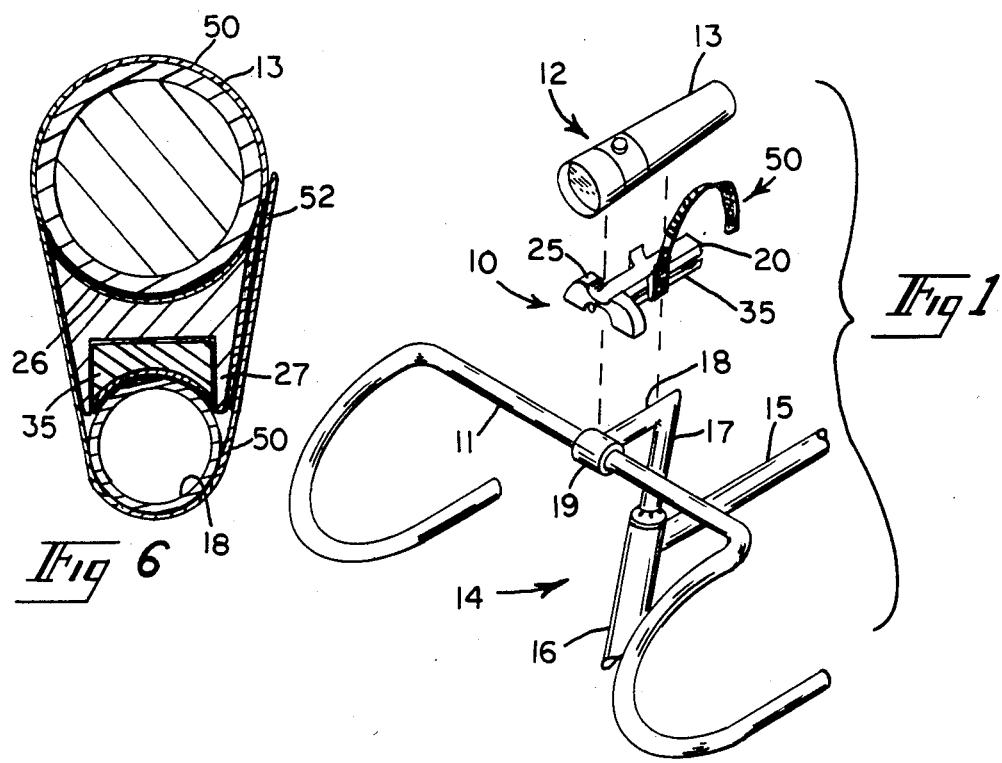
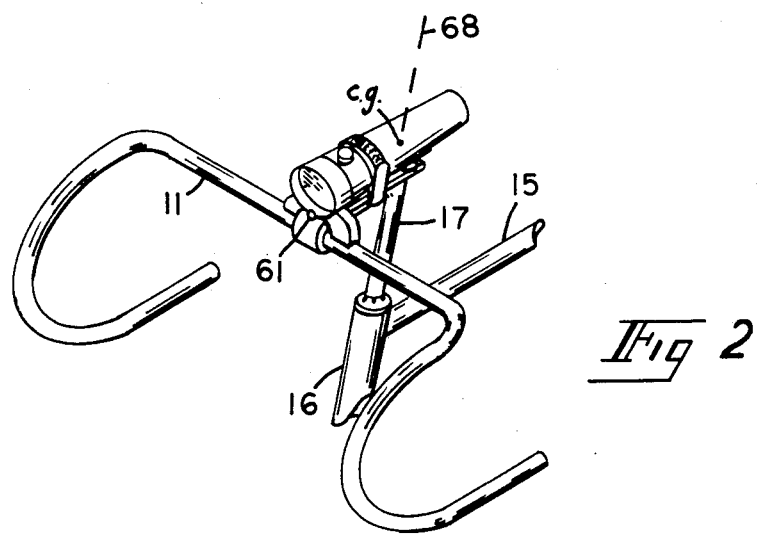

U.S. Patent  Oct. 21, 1986  Sheet 2 of 6  4,618,081
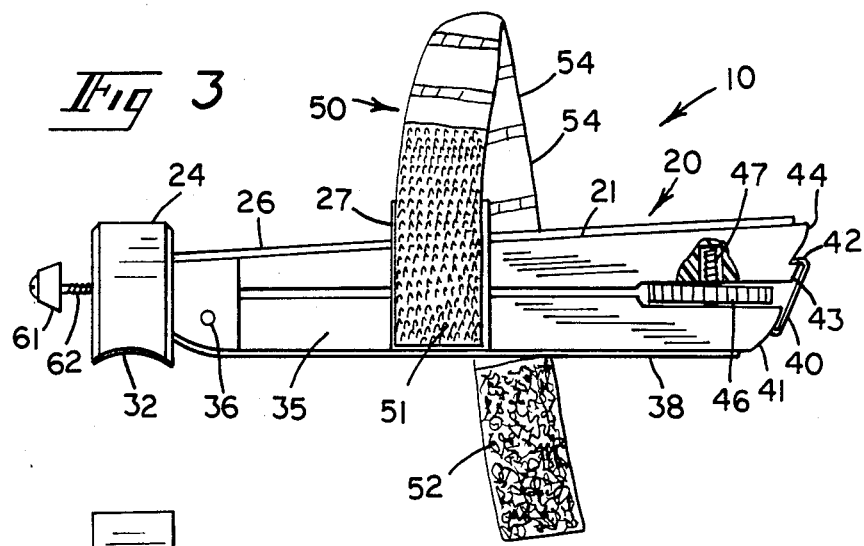
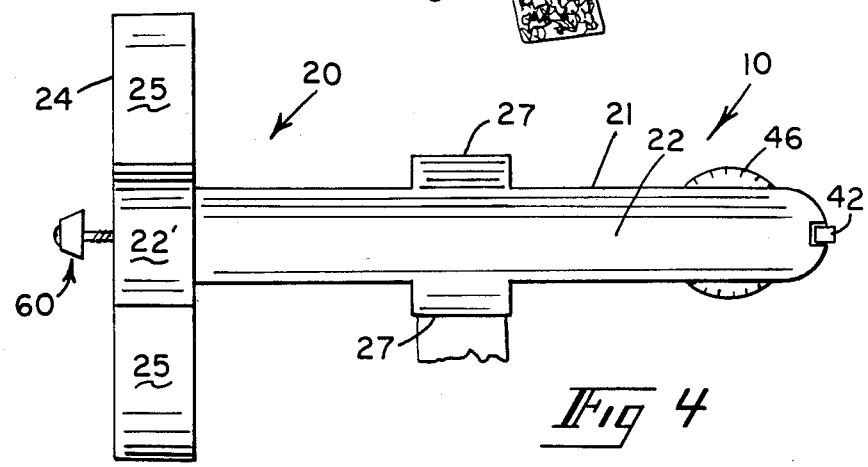
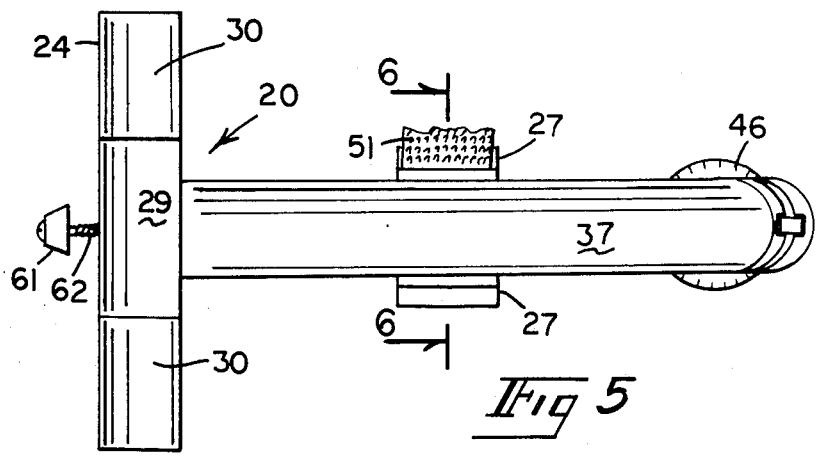

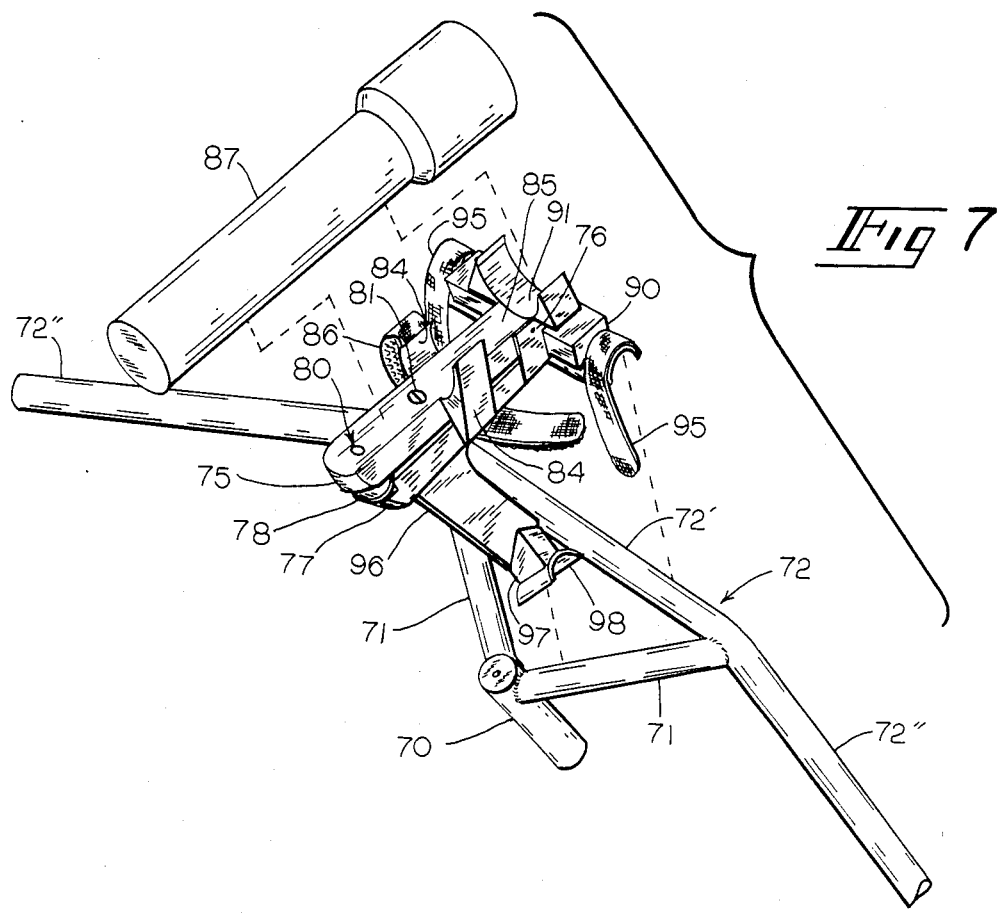
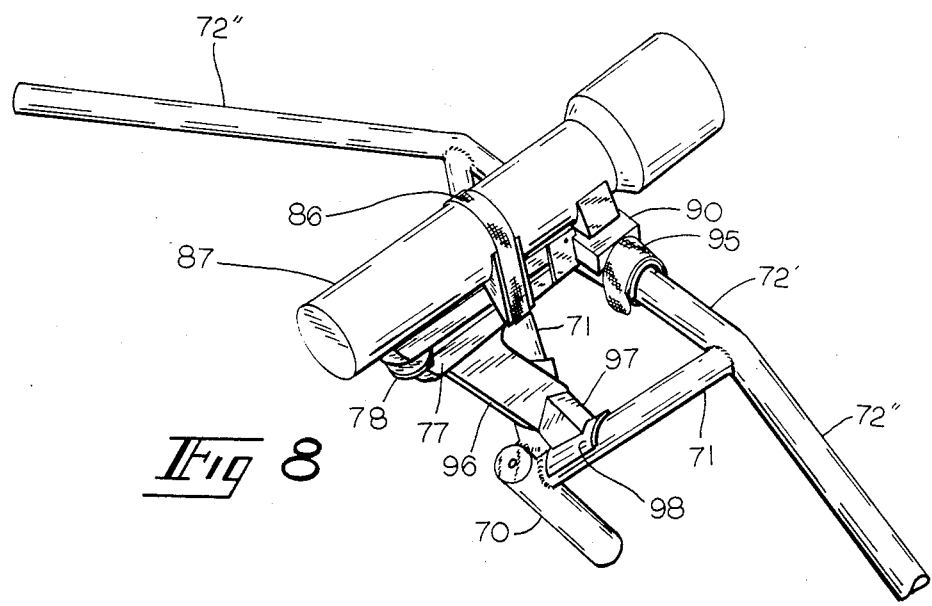

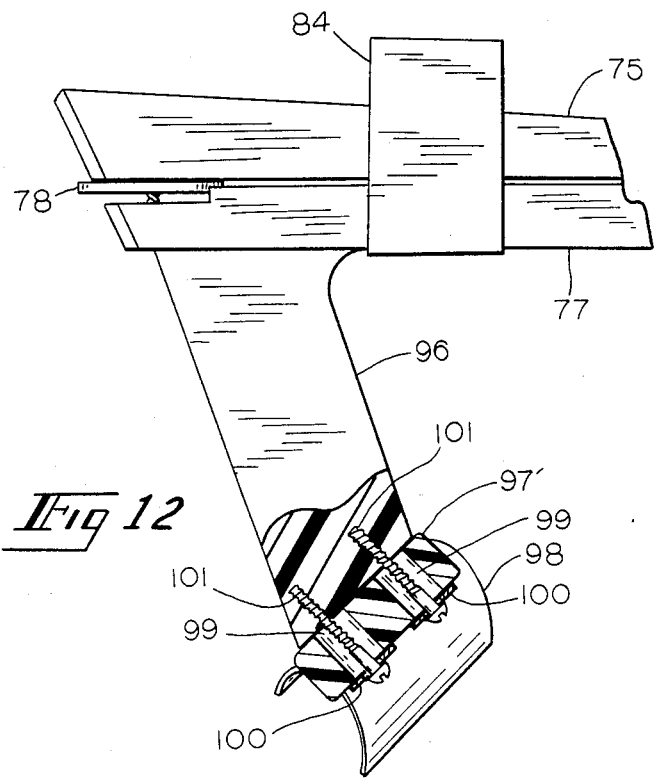
_Fig 12_
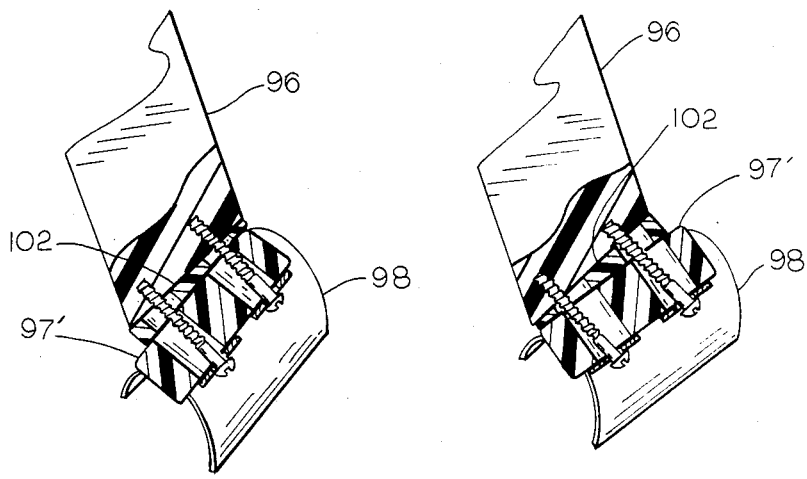
_Fig 13_     _Fig 14_

APPARATUS FOR MOUNTING FLASHLIGHTS TO BICYCLES

REFERENCE TO RELATED APPLICATION

This is a continuation-in-part of application Ser. No. 559,098 filed Dec. 7, 1983, now Patent No. 4,541,555 issued Sept. 17, 1985.

TECHNICAL FIELD

This invention relates to apparatuses for mounting lamps such as flashlights to bicycles.

BACKGROUND OF THE INVENTION

Apparatus have heretofore been developed for mounting dry cell battery powered flashlights to bicycles in various manners. For example, some mounting devices have been developed for mounting flahslights to bicycles to provide oscillatory types of safety lamps. Exemplary of these are those disclosed in U.S. Pat. Nos. 2,788,763 and 2,811,633. Apparatuses have also been developed for mounting flashlights to the rears of bicycles to provide taillights. U.S. Pat. No. 2,728,824 exemplifies these types of mounts. Still other apparatuses have been devised for mounting flashlights to bicycles to provide headlights as exemplified by those disclosed in U.S. Pat. Nos. 1,222,458, 1,449,509, 1,735,212, 3,810,559, 4,170,337 and 4,390,927 and in Swiss Pat. No. 285,978.

The prior art apparatuses used in mounting bicycle headlights have had a number of deficiencies. For example, being secured as with nuts and bolts to the bicycles, they have required the use of tools such as pliers to mount them. In addition, those to which flashlights are not permanently mounted, like that shown in U.S. Pat. No. 4,170,337, have also required the manipulation of other fastening means, such as wing nuts and the like, to mount the flashlights securely to the mounts once the mounts themselves have been mounted, and to dismount the flashlights from the mounts. Thus, even when the flashlights are dismounted the mounts typically remain on the bicycles. Not only are such naked mounts unsightly but they provide dead weight.

The stability of the prior art mounting apparatuses has also been lacking. Once mounted the flashlights have often not been located along a fore and aft axis of the bicycle, being in the plane in which the bike wheels lie when mutually aligned. With the advent of modern light-weight, high-speed bicycles the mounting of relatively heavy flashlights, fully loaded with batteries, off of their fore and aft axes has provided an adverse imbalance that is clearly discernable by discriminating riders. In addition to being off-axis they have also been mounted at some distance from the axes of the upright front wheel steering stems thereby creating moments of inertia about the stem axes each time the bicycles strike bumps or depressions in the roadway. This has tended to loosen the flashlight from their mounts as well as the mounts from the bicycles.

In addition to the foregoing, the flashlight mounting appartuses of the prior art have not possessed the capability of enabling a rider to alter flashlight tilt readily while riding so as to effect changes in beam angle. Some of the devices have also been lacking in versatility with regard to their ability to mount flashlights of different shapes and sizes without having to interchange mount parts. Still others have had a tendency to scratch or mar the bicycles. Accordingly, it is to the provision of apparatuses for mounting flashlights to bicycles which overcome these deficiencies of the prior art to which the present invention is primarily directed.

SUMMARY OF THE INVENTION

In one form of the invention apparatus for mounting a flashlight to a bicycle having a steering stem formed with a collar through which handlebars extend comprises a support having a bottom surface contoured to be seated snugly atop the bicycle steering stem neck adjacent the neck collar and a concave upper surface in which a flashlight may be nestled. The apparatus also comprises a flexible strap bearing fastening means. The strap is secured to the support and is of a sufficient length as to be wrapped over a flashlight nestled in the support concave upper surface and under the bicycle stem neck atop which the support is snugly seated and secured to itself by the fastening means.

In another form of the invention apparatus for mounting a flashlight to a bicycle along a bicycle axis comprises an elongated base having a bottom surface contoured to be seated snugly atop the bicycle steering stem neck with a rear base end located adjacent the stem and a forward base end located adjacent a neck collar. The apparatus also includes an elongated cradle having a concave top surface in which a flashlight may be nestled. The cradle is pivotably mounted atop the base along a pivot axis located adjacent the base forward end and a forward end of the cradle. Means are also provided for adjusting the height of the cradle rear end with respect to the base rear end whereby the angle of tilt of a flashlight nestled atop the cradle may be altered. Binding means are provided for binding both the base to the bicycle neck and a flashlight to the cradle.

In another form of the invention apparatus for mounting a flashlight to a bicycle of the type having a neck that extends from an upright stem to a neck collar through which handlebars extend comprises a T-shaped support having a trunk and a crossarm with the bottom surface of the trunk being contoured to be seated flush atop the bicycle neck and with the bottom surface of the crossarm being contoured to be seated flush atop the bicycle neck collar. A self-adherent elastic strap is mounted at one end to the support which is of the length sufficient to encircle the support, a flashlight mounted atop the support and a flashlight neck atop which the support is mounted.

In another form of the invention a mount for mounting a flashlight to a bicycle of the type having a handlebar from which a pair of struts extends comprises a cradle having a concave upper surface in which a flashlight may be nestled, and a forward crossarm extending laterally from a forward end of the cradle which has a bottom concave surface for mating engagement with the handlebar. A stanchion extends downwardly from a rear end of the cradle and a rear crossarm extends laterally from a lower end of the stanchion which has outwardly facing ends shaped to be mated against the bicycle struts. Binding means are also provided for releasibly binding the forward crossbar to the handlebar and a flashlight to the cradle.

In another form of the invention a mount for mounting a flashlight to a bicycle of the type having a handlebar from which a pair of struts convergently extend towards a steering column has an elongated upper surface upon which a flashlight may be supported and an elongated lower mounting surface oriented generally right angularly to the elongated upper surface shaped to be mated flushly against the handlebar. The mount has a pair of concave outwardly facing side surfaces spaced from the lower mounting surface a distance for wedging engagement with the pair of convergent struts. The mount also has means for releasably holding a flashlight upon the upper surface and the mount to the handlebar.

In yet another form of the invention a mount for mounting a flashlight to a bicycle of the type having a lower stay bar from which a rear stay bar upwardly inclines has lower and upper generaly semi-cylindrical channels joined together by a web with the channels forming an acute angle and opening generally towards mutually normal planes for respective mating engagement with the top of the lower stay bar and a side of the rear stay bar. The mount has another channel shaped to hold a flashlight therein that extends generally parallel with the lower channel aside the web. Binding means are provided for binding the upper channel to the rear stay bar and a flashlight to the other channel.

In still another form of the invention a mount for mounting a flashlight to a bicycle of the type having a lower stay bar from which a rear stay bar upwardly inclines from adjacent a rear wheel axis has two elongated concave surfaces oriented at an acute angle with respect to each other that face mutually transverse planes so as to be adapted to be respectively mated atop the lower stay bar and aside the rear stay bar. The mount has a third elongated concave surface adapted to hold a flashlight. The mount also has binding means for releasibly binding a flashlight within the third elongated concave surface and the mount to the rear stay bar.

BRIEF DESCRIPTION OF THE DRAWING

FIG. 1 is a disassembled view, in perspective, of a steering portion of a bicycle, flashlight mounting apparatus embodying principles of the present invention, and a flashlight.

FIG. 2 is an assembled view, in perspective, of the devices illustrated in FIG. 1.

FIG. 3 is a side elevational view of the flashlight mounting apparatus depicted in FIG. 1.

FIG. 4 is a plan view of the flashlight mounting apparatus shown in FIG. 1.

FIG. 5 is a bottom view of the flashlight mounting apparatus shown in FIG. 1.

FIG. 6 is a cross-sectional view of the assembly shown in FIG. 2 taken along the plane 6—6 identified in FIG. 5.

FIG. 7 is a disassembled view, in perspective, of a steering portion of another type bicycle, flashlight mounting apparatus embodying principles of the invention in another form, and a flashlight.

FIG. 8 is an assembled view, in perspective, of the devices illustrated in FIG. 7.

FIG. 12 is a side elevational view, shown partly in cross-section, of a modified, adjustable version of the flashlight mounting apparatus shown in FIG. 7 while FIGS. 13 and 14 show elements of the apparatus in different positions of adjustment.

DETAILED DESCRIPTION

Figure 9:
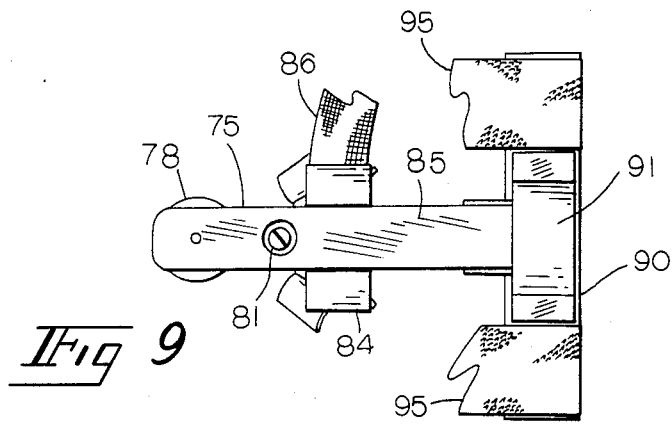
FIG. 9 is a plan view of the flashlight mounting apparatus shown in FIG. 7.
Figure 10:
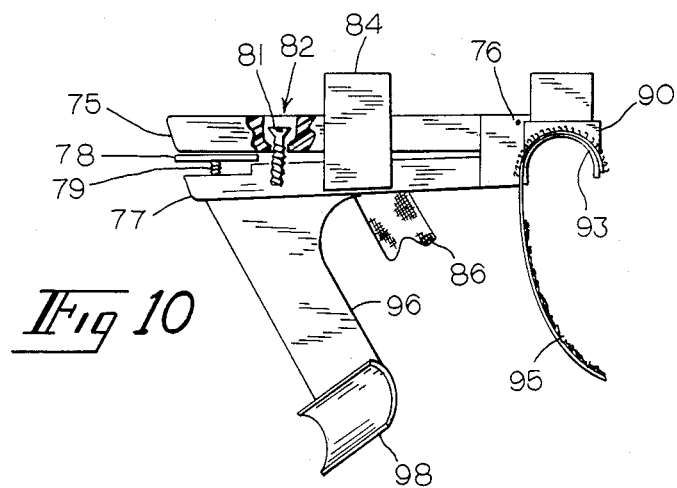
FIG. 10 is a side elevational view of the flashlight mounting apparatus shown in FIG. 7.
Figure 11:
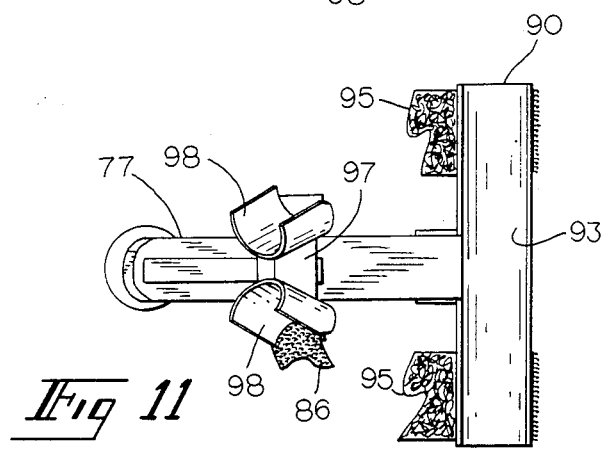
FIG. 11 is a bottom view of the flashlight mounting apparatus shown in FIG. 7.

Referring now in detail to the drawing, there is shown apparatus indicated generally at 10 for mounting a flashlight 12 to a bicycle 14 along a front to rear axis lying within the vertical plane in which the bicycle wheels lie when aligned and along which plane the bicycle tubular frame member 15 also lies. The bicycle is seen to have a steering column 16 from which emerges a steering stem 17 that is formed with a neck 18 that terminates with a collar or clamp 19 from which handlebars 11 laterally extend. The mounting apparatus is essentially a T-shaped support. More specifically, it comprises an elongated cradle 20 of a generally T-shaped configuration having an elongated trunk 21 formed with a concave upper surface 22 which trunk merges with a laterally extending crossarm 24 having convex upper surfaces 25 that straddle a concave upper surface 22' that merges with trunk surface 22. The degree of curvature of surfaces 22 and 22' is made to match generally that of the surface of casing 13 of the flashlight 12 which casing is normally cylindrical. The surfaces 22 and 22' are preferably covered with a resilient pad 26. The cradle is also formed with two side wings 27 whose upper surfaces are also concave so as to merge laterally with the concave upper surface 22. The bottom surface of the crossarm portion of the cradle, as shown in FIG. 5, has a concave central portion 29 and two other concave portions 30 that straddle portion 29. The portion 29 is contoured to match generally the surface of the bicycle neck collar 19 while portions 30 are contoured to match generally that of handlebars 11. The bottom surfaces of the crossarm 24 are also covered with a resilient pad 32. These various pads, which are secured to the cradle by adhesive, are not shown in FIGS. 4 and 5, for clarity of explanation.

With continued reference to the drawing the apparatus is seen also to include a base indicated generally at 35 which, like the cradle, is preferably formed of plastic. The base 35 is pivotably mounted to the cradle by a pivot pin 36. The bottom surface 37 of the base is concave and covered with a resilient pad 38 that also is not shown in FIG. 5. A tang 40 is rigidly mounted to the rear end 41 of the base which has a reentrant projection or lip 42 which overlays a step 43 formed in the rear end 44 of the cradle. This construction enables the lip 42 to serve as a stop in limiting pivotable movement of the cradle rear end away from the base rear end. A thumbscrew 46 is threaded upon a post 47 whose bottom end is rigidly mounted to the base 35 and whose upper end extends into a recess formed in the cradle 20, as shown in FIG. 3. The thumbscrew provides means for changing the elevation and the rear end of the cradle 20 with respect to the base 35 by pivotable movement about pivot pin 36. Again, such pivotal movement is limited by the stop action of the lip 42 of tang 40.

With continued reference to the drawing the mounting apparatus is further seen to include a strap indicated generally at 50 which has one end 51 secured as by adhesive to one wing 27 of the cradle. This permanently attached end 51 of the strap is formed with a self-fastening material as is its opposite, free end 52. Preferably, mating Velcro strips are used for self-fastening materials. So constructed, the two strap ends may be releasibly fastened by merely passing them flushly together. Velcro, as is well known, is formed of two mating strips of fibrous material with one being composed of a mass of hook-like fibrous anchors and the other of mating material. The two strap ends 51 and 52 are connected by an elastic section 54. The length of the entire strap is sufficient to enable it to encircle the cylindrical casing 13 of the flashlight 12, the bicycle stem neck 18 as well as the mounting apparatus itself, and the two strap ends 51 and 52 to be overlaid and releasibly together as shown in FIGS. 2 and 6. It should be noted that when this is done the strap not only encircles the assembly but does so in almost continuous contact therewith as shown in FIG. 6.

Finally, the apparatus is seen to include a screw 60 having a head 61 formed on an end of a threaded shank 62. A portion of the head 61 is located above the bottom of the upper concave surface 22 of the cradle to provide an adjustable stop for the front end of the flashlight 12, as shown in FIG. 2.

In use the apparatus is placed flush atop the bicycle neck 18 the neck collar 19 and the handlebars 11. This is done quite securely since the bottom surface 37 of the base is contoured to fit snugly atop the upper surface of the neck 18 and the bottom surfaces 29 and 30 of the cradle crossbar contoured to fit snugly atop the bicycle neck collar 19 and handlebars 11, respectively. Slight size differences in bicycle necks and neck collar diameters matter little in view of the provision of the pads. The flashlight 12 may contemporaneously or before or afterwards be placed atop the cradle 20 with its cylindrical casing 13 nestled snugly within the concave surfaces 22 and 22' of the cradle and with the front end of the flashlight butted against screw head 61. The stop may then be adjusted to position the center of gravity c.g. of the flashlight along the axis 68 of bicycle stem 17 that projects upwardly out of the steering column 16. Again, slight mismatches between flashlight casing and cradle sizes are compensated by the pad 26.

Next, the strap 50 is wrapped tautly over the upper surface of the flashlight casing 13, wing 27, around the bottom of neck 18 and the strap end 52 pressed against and thereby fastened to strap end 51. The flashlight is now securely mounted to the bicycle as shown in FIGS. 2 and 6 with the strap almost continuously flush against the flashlight, mount and bicycle stem since the side walls of cradle wings 27 extend tangentially to the flashlight casing and the stem. To dismount the flashlight and the mounting apparatus the strap end 52 is merely peeled from strap end 51 and unwrapped from under the bottom of the bicycle neck and flashlight whereupon both the mounting apparatus as well as the flashlight are dismounted from the bicycle.

The apparatus of FIGS. 1-6 is of relatively simple, economical and light-weigh construction. It, as well as the flashlight which it holds, may be readily mounted and dismounted to a bicycle with manual facility and without the use of ancillary tools. Once mounted the flashlight is positioned along a fore and aft axis of the bicycle whereby translational equilibrium is not disrupted by the weights of the mount and of the flashlight being laterally off-axis. Furthermore, as the center of gravity of the flashlight is located upon the stem axis, moments of inertia do not tend to be created that would tend to pitch the flashlight as the bicycle encounters depressions and bumps in the roadways over which it is driven. Its construction also provides a very high degree of stability of both the mounting apparatus as well as the flashlight once mounted to a bicycle with virtually no chance of the mount or the flashlight becoming loose or falling from the bicycle unless the mount or flashlight itself is actually struck by some object.

With reference next to FIGS. 7-11 apparatus is shown for mounting a flashlight to a "mountain" type bicycle which embodies principles of the invention in another form. This type of bicycle has a steering structure that differs from that shown in FIGS. 1-2 in that they have a bifurcated neck. More specifically, as shown in FIGS. 7-8 these bicycles have an upright steering column 70 from which two cylindrical struts 71 laterally extend at a slightly acute angle to a handlebar 72. Typically, that portion 72' of the handlebar which extends between the ends of the two struts 71 is straight and merges with outboard portions 72" that slant slightly to the rear. In this embodiment the flashlight mounting apparatus, again formed preferably of plastic material, is seen to have an elongated cradle 75 which has a concave upper surface 85 that is pivoted by a pivot pin 76 to an elongated base 77. Means are again provided for adjusting the position of cradle 75 with respect to base 77 which includes a thumbscrew 78 threaded upon a post 79 that extends upwardly from the base and into a hole 80 in the cradle. Stop means for limiting the separation of the cradle from the base here is in the form of a flat headed screw 81 that extends upwardly from the base and into a cavity 82 in the cradle, the lower portion of which has a radius smaller than that of the screwhead. The cradle also has a pair of side wings 84 whose upper surfaces are convex so as to coextend from the upper surface 85 of the cradle. An elastic strap 86 is mounted as by adhesive to an outboard side of one of the wings 84. The strap is of a size sufficient to be wrapped about the casing of a flashlight 87 seated upon the upper surface 85 of the cradle, around over the other side wing 84, under the bottom of the base and then back into self contact with itself so as to bring mating strips of Velcro material secured thereto into interlocking engagement as shown in FIG. 8.

The apparatus is further seen to have a forward crossarm 90 that extends laterally to each side of a foward end of base 77. The crossarm has a generally semi-cylindrical upper surface 91 which extends from adjacent the upper concave surface 85 of the cradle. The crossarm has an alongated bottom surface 93 of a semi-cylindrical shape adapted to be set in mating engagement upon the elongated handlebar portion 72'. Two flexible straps 95 are mounted to opposite ends of the crossbar which are of a length sufficient to be wrapped around the handlebar portion 72' and back upon themselves to bring two mating Velcro strips attached thereto into overlapping relation. The apparatus also has a stanchion 96 that extends downwardly from a rear end portion of the bottom of the base 77. A rear crossarm 97 extends laterally to each side of the stanchion from its bottom to merge with two semi-cylindrical channels 98 that are oriented at a slightly acute angle with respect to one another which angle substantially matches that formed by the two bicycle struts 71.

In use, the apparatus is set atop the handlebars by setting the semi-cylindrical, outwardly facing surfaces of channels 98 of the rear crossarm 97 directly upon the struts 71 and placing the semi-cylindrical bottom surface 93 of the forward crossarm 90 directly upon the handlebar portion 72', as shown in FIG. 8. The mount is then releasibly bound to the handlebars by wrapping the two flexible straps 95 under the handlebar portion 72' and back upon themselves bringing the mating Velcro surfaces into interlocking engagement with each other. At this point the apparatus is firmly mounted to the bicycle with the rear crossarm effectively wedged upon the convergent struts 71 adjacent their juncture. A flashlight 87 may then or have previously been releasibly bound to the mount by seating its casing atop the cradle and wrapping the elastic strap 86 about it, the cradle and base and back over itself so as to become self fastened by the Velcro materials. A beam of the light emitted from the flashlight may then be raised or lowered by turning the thumbscrew 78 so as slightly to raise or lower the rear end of the cradle.

Mountain type bicycles are not all manufactured with their struts extending from the handlebars at the same angle and orientation. To provide for variations the apparatus of FIGS. 7-11 may be provided with adjustment means to accomodate for such variations. Thus, in FIGS. 12-14 a modified version of the apparatus just described is shown wherein the rear crossbar 97 is not formed as a lateral, unitary extension of the stanchion 76 but rather as a separate component. In this modified version the generally semi-cylindrical channels 98 may be made to assume different orientations as well as slightly different spacings relative to the forward crossarm 90. In FIG. 12 the crossarm 97 is shown to be formed with two holes 99 extending therethrough, the bottom of which are overlaid with washers 100. Two screws 101 are seen to be threaded at right angles to the beveled bottom end of the stanchion 96 and to extend through the holes 99 and washers 100. If the geometry of the steering mechanism of the mountain bike is such as to dictate a necessary change in the spacial relation between the collars 98 and the forward crossarm, the rear crossarm and collars may be slid up and to the right or down and to the left, as viewed in the drawing, by merely loosening the screws 101 and then sliding the crossarm until the sides of the screw abut one side or the other of the holes 99. If the geometry of the steering column, and particularly that of the struts 71 with respect to the handlebar portion 72' dictates, the orientation of the semi-cylindrical channels 98 may also be altered through the use of a shim 102 as shown in FIGS. 13 and 14. Thus, in FIG. 13 it is seen that the channel 98 has assumed a more upright orientation by positioning the shim, which has also two holes extending therethrough, between the bottom of the stanchion 96 and the rear crossarm. In FIG. 14 the orientation of the shim has been reversed so that the channels 98 now extend at a lesser angle of incline. In FIG. 13 it should be also noted that in addition to the collars having assumed a more upright orientation they have been slid further away from the forward crossarm. Conversely, in FIG. 14 the collars have not only assumed a less inclined attitude but also have been slid forward slightly towards the forward crossarm. Since ordinarily a user will use the mount with a single bicycle, he or she ordinarily will only have to make such an adjustment once.

Figure 15:
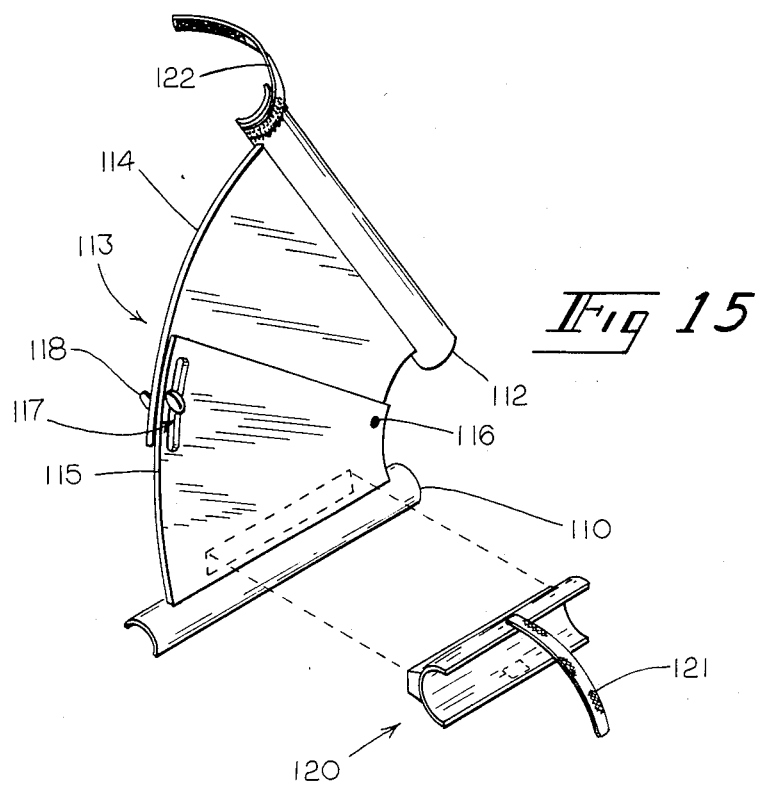
FIG. 15 is a partially exploded view, in perspective, of flashlight mounting apparatus embodying principles of the invention in yet another form.
Figure 16:
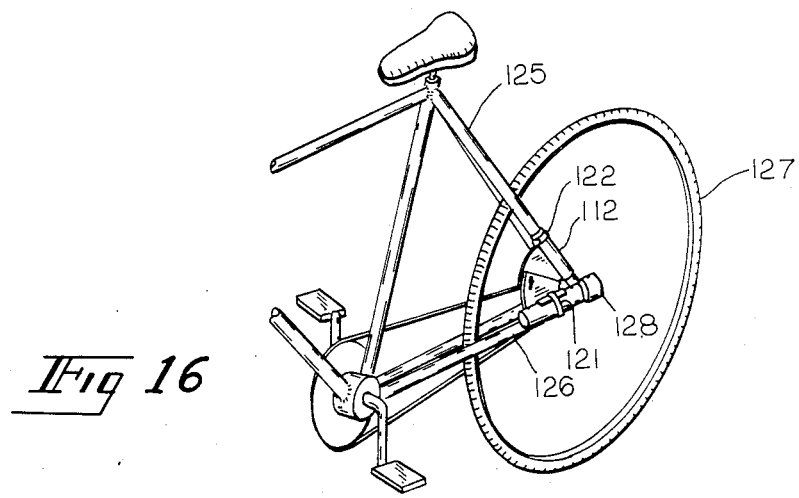
FIG. 16 is a perspective view of the apparatus illustrated in FIG. 15 shown mounted to a bicycle and holding a flashlight.

With reference to FIGS. 15 and 16 yet another embodiment of the invention is shown which is here specifically designed for use in mounting a flashlight to serve as a bicycle taillight. However, this embodiment may be altered to render it suitable for use in supporting a flashlight so to serve as a headlight on a BMX type of bicycle which has generally upright, U-shaped handlebars by reorientating the surface that directly supports the flashlight. This is because in both situations the apparatus is mounted to two structural bar elements of a bicycle that are mutually convergent. However, for the BMX adaptation the mounting channels would normally be slightly arcuate rather than purely linear.

The apparatus here is seen to include two generally semi-cylindrical, linear mounting channels or collars 110 and 112 which are held together to form an acute angle by means of a web shown generally at 113. They are also oriented with their openings facing matually transverse planes, i.e., channel 110 opens facing downwardly here while channel 112 opens facing a side of the mount. The web is in the form of two overlapping plates 114 and 115 that are pivoted together by a pivot pin 116. The plates 114 and 115 are each provided with overlapping, elongated slots 117 through which a clamping screw 118 extends. With this construction the extend of the overlapping relationship of the plates 114 and 115 of the web 113 may be adjusted to alter the spacing between the channels 110 and 112 as well as their mutual orientation, i.e., the acute angle that they form. The apparatus includes a third channel 120 which is shown in FIG. 13, for clarity of illustration, broken away from the plate 115 but in actuality is preferably formed integrally with the plate. This channel 120 is oriented substantially parallel to the channel 110 but has its opening facing in the opposite direction as the opening of channel 112. A flexible strap 121 is secured to the channel 120 while another strap 122 is secured to an end of the channel 112. Each of these flexible straps bears mating Velcro material. The length of the strap 122 is sufficient to be wrapped about a stay bar member of the bicycle into overlapping engagement with itself so as to bring mating surfaces of the Velcro material into a releasibly interlocking relationship. Where adapted for use with a BMX type bicycle the channel 120 is reoriented at a 90° angle from that here shown and another strap 122 is secured to an end of channel 110.

The apparatus shown in FIG. 15 may be readily mounted to a rear portion of a bicycle as shown in FIG. 16. Here, it is seen that the channel 112 has been placed in mating engagement against an outboard side of a rear stay bar 125 while the other channel 110 has been placed atop the lower stay bar 126 adjacent the axis of the rear wheel 127. A flashlight 128 has also been mounted in the channel 120 and secured in place by strap 121. The mount itself has been bound to the bicycle by strap 122 wrapped about the inclined rear stay bar 125.

It thus is seen that apparatuses in several forms have been described for mounting flashlights to bicycles. It should be understood, however, that the just described embodiments merely illustrate principles of the invention in preferred forms. Many modifications, additions and deletions may be made thereto without departure from the spirit and scope of the invention as set forth in the following claims.

I claim:

1. A mount for mounting a flashlight to a bicycle of the type having a handlebar from which a pair of struts extend, and with the mount comprising a cradle having a concave upper surface in which a flashlight may be cradled, a forward crossarm extending laterally from a forward end of said cradle and which has a bottom surface shaped to be mated against the handlebar, a stanchion extending downwardly from a rear end of said cradle, a rear crossarm extending laterally from a lower end of said stanchion and which has ends shaped to be mated against the bicycle struts, and binding means for binding said forward crossbar to the handlebar and a flashlight to said cradle.

2. The mount of claim 1 wherein said binding means includes a strap mounted to said cradle and a pair of additional straps mounted to said forward crossarm to opposite sides of said cradle.

3. The mount of claim 2 wherein each of said straps bears two strips of mutually interlocking fibrous materials.

4. The mount of claim 1 wherein said cradle has an upper section pivoted to a lower section and means for adjusting the relative position of said upper section with respect to said lower section.

5. The mount of claim 4 wherein said adjusting means comprises a threaded post mounted atop said cradle lower section to which a thumbscrew is threaded.

6. The mount of claim 4 further comprising stop means for limiting the relative position of said upper section with respect to said lower section.

7. The mount of claim 1 wherein said rear crossarm is removably mounted to said stanchion at a plurality of orientations and positions with respect thereto.

8. A mount for mounting a flashlight to a bicycle of the type having a handlebar from which a pair of struts convergently extend towards a steering column, and with the mount having an elongated upper surface upon which a flashlight may be supported, an elongated lower mounting surface oriented generally right angularly to said elongated upper surface and shaped to be mated against the handlebar, a pair of concave outwardly facing side surfaces spaced from said lower surface a distance for wedging engagement with the pair of convergent struts, and means for releasibly holding a flashlight upon said upper surface and the mount to the handlebar.

9. The mount of claim 8 wherein said holding means comprises a plurality of straps bearing mutually interlocking fibrous materials.

10. The mount of claim 8 having means for adjusting the position of said upper surface with respect to said pair of side surfaces.

11. The amount of claim 8 having means for adjusting the orientation of said pair of side surfaces with respect to said upper and lower surfaces.

12. The mount of claim 10 wherein said bottom surface and each of said side surfaces is generally semi-cylindrical.

* * * * *